United States Patent
Yang et al.

(10) Patent No.: US 10,747,012 B2
(45) Date of Patent: Aug. 18, 2020

(54) METHOD AND SYSTEM FOR TUNABLE GRADIENT PATTERNING USING A SHADOW MASK

(71) Applicant: Magic Leap, Inc., Plantation, FL (US)

(72) Inventors: Shuqiang Yang, Austin, TX (US); Vikramjit Singh, Pflugerville, TX (US); Kang Luo, Austin, TX (US); Nai-Wen Pi, Plano, TX (US); Frank Y. Xu, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/705,127

(22) Filed: Dec. 5, 2019

(65) Prior Publication Data

US 2020/0110278 A1   Apr. 9, 2020

Related U.S. Application Data

(63) Continuation of application No. 16/182,309, filed on Nov. 6, 2018, now Pat. No. 10,527,865.

(60) Provisional application No. 62/582,082, filed on Nov. 6, 2017.

(51) Int. Cl.
*G02B 27/42* (2006.01)
*G02B 5/18* (2006.01)
*G02B 27/01* (2006.01)
*G02B 27/00* (2006.01)

(52) U.S. Cl.
CPC ....... *G02B 27/4255* (2013.01); *G02B 5/1814* (2013.01); *G02B 27/0081* (2013.01); *G02B 27/0172* (2013.01); *G02B 27/4272* (2013.01); *G02B 2027/0125* (2013.01); *G02B 2027/0174* (2013.01)

(58) Field of Classification Search
None
See application file for complete search history.

(56) References Cited

U.S. PATENT DOCUMENTS

| | | | | |
|---|---|---|---|---|
| 4,939,373 A | * | 7/1990 | Elliston | B82Y 10/00 250/398 |
| 5,629,070 A | | 5/1997 | Korth | |
| 8,009,356 B1 | * | 8/2011 | Shaner | G02B 27/56 359/288 |

(Continued)

FOREIGN PATENT DOCUMENTS

JP    2012054367 A    3/2012

OTHER PUBLICATIONS

PCT/US2018/059440, "International Search Report and Written Opinion", dated Jan. 18, 2019, 8 pages.

*Primary Examiner* — Allan W. Olsen
(74) *Attorney, Agent, or Firm* — Kilpatrick Townsend & Stockton LLP

(57) ABSTRACT

A method of depositing a variable thickness material includes providing a substrate and providing a shadow mask having a first region with a first aperture dimension to aperture periodicity ratio and a second region with a second aperture dimension to aperture periodicity ratio less than the first aperture dimension to aperture periodicity ratio. The method also includes positioning the shadow mask adjacent the substrate and performing a plasma deposition process on the substrate to deposit the variable thickness material. A layer thickness adjacent the first region is greater than a layer thickness adjacent the second region.

20 Claims, 13 Drawing Sheets

(56) References Cited

U.S. PATENT DOCUMENTS

| | | | |
|---|---|---|---|
| 9,651,862 B2* | 5/2017 | Fletcher | B29C 43/021 |
| 10,527,865 B2 | 1/2020 | Yang et al. | |
| 2002/0149850 A1* | 10/2002 | Heffner | G02B 5/284 |
| | | | 359/578 |
| 2002/0150378 A1* | 10/2002 | Heffner | G02B 6/266 |
| | | | 385/140 |
| 2004/0099891 A1* | 5/2004 | Mehrotra | H01L 21/28123 |
| | | | 257/288 |
| 2005/0063071 A1 | 3/2005 | Wang et al. | |
| 2006/0066948 A1 | 3/2006 | Mizuyama | |
| 2006/0119853 A1* | 6/2006 | Baumberg | G01N 21/658 |
| | | | 356/445 |
| 2008/0023724 A1* | 1/2008 | Takeda | H01L 51/5265 |
| | | | 257/103 |
| 2010/0323917 A1* | 12/2010 | Vertes | H01J 49/0418 |
| | | | 506/12 |
| 2012/0001302 A1* | 1/2012 | Matsumura | C23C 16/0218 |
| | | | 257/622 |
| 2014/0166986 A1* | 6/2014 | Pang | H01L 51/506 |
| | | | 257/40 |
| 2014/0353678 A1* | 12/2014 | Kawakami | H01L 21/266 |
| | | | 257/76 |
| 2015/0034591 A1 | 2/2015 | Vink et al. | |
| 2016/0062037 A1* | 3/2016 | Horino | G02B 6/1228 |
| | | | 385/14 |
| 2018/0364586 A1* | 12/2018 | Clube | G03F 7/70091 |
| 2018/0374423 A1* | 12/2018 | Kim | H01L 51/5228 |
| 2019/0137777 A1 | 5/2019 | Yang et al. | |

* cited by examiner

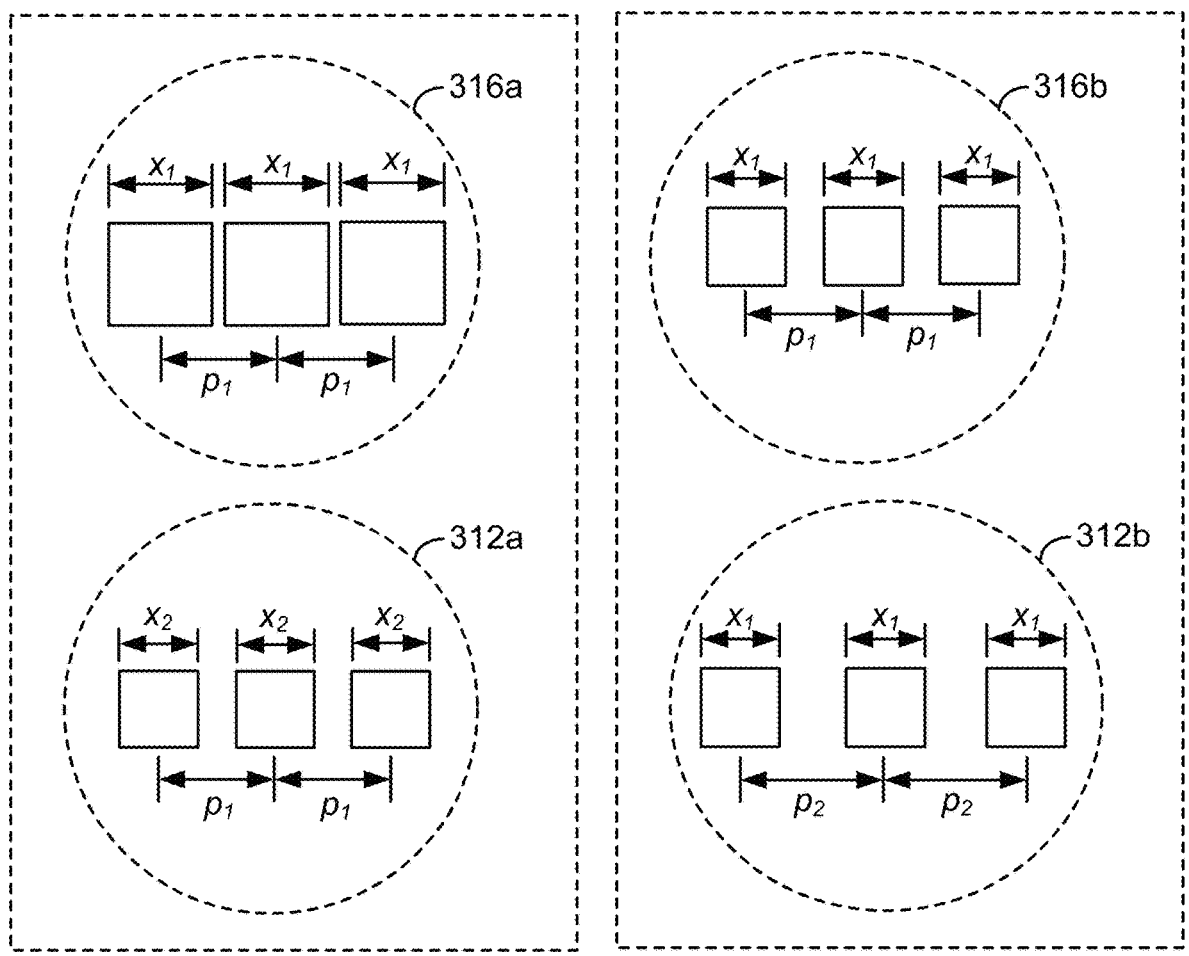
*FIG. 3B*  *FIG. 3C*

FIG. 4B  FIG. 4C  FIG. 4D

METHOD AND SYSTEM FOR TUNABLE GRADIENT PATTERNING USING A SHADOW MASK

CROSS-REFERENCES TO RELATED APPLICATIONS

This application is a continuation of U.S. patent application Ser. No. 16/182,309 filed on Nov. 6, 2018, now U.S. Pat. No. 10,527,865, issued on Jan. 7, 2020, entitled "METHOD AND SYSTEM FOR TUNABLE GRADIENT PATTERNING USING A SHADOW MASK," which is a non-provisional of and claims the benefit of and priority to U.S. Provisional Patent Application No. 62/582,082, filed on Nov. 6, 2017, entitled "METHOD AND SYSTEM FOR TUNABLE GRADIENT PATTERNING USING A SHADOW MASK," the disclosures of which are hereby incorporated by reference in their entirety for all purposes.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods and systems related to augmented reality systems, particularly, display systems.

SUMMARY OF THE INVENTION

The present disclosure relates to virtual reality and augmented reality imaging and visualization systems. The present disclosure relates generally to methods and systems related to fabrication of diffractive structures in which the diffractive elements have a varying depth as a function of position. The embodiments described herein can be applied in the context of a diffraction grating based waveguide display that is used for near eye display. In a particular embodiment, gratings with a gradient depth profile are utilized to improve the field uniformity and increase light outcoupling efficiency. As described herein, some embodiments utilize a shadow mask and dry etching process to fabricate gratings with a gradient depth profile achieved by controlling the plasma density on the substrate surface. The disclosure is applicable to a variety of applications in computer vision and image display systems.

According to an embodiment of the present invention, a method of fabricating a diffractive structure with varying diffractive element depth is provided. The method includes providing a shadow mask having a first region with a first aperture dimension to aperture periodicity ratio and a second region with a second aperture dimension to aperture periodicity ratio less than the first aperture dimension to aperture periodicity ratio and positioning the shadow mask adjacent a substrate, wherein the substrate comprises an etch mask corresponding to the diffractive structure. The method also includes exposing the substrate to an etchant, etching the substrate to form diffractive elements adjacent the first region having a first depth, and etching the substrate to form diffractive elements adjacent the second region having a second depth less than the first depth.

According to another embodiment of the present invention, a method of fabricating a master substrate is provided. The method includes providing a shadow mask having a first region characterized by a first gradient aperture dimension to aperture periodicity ratio in at least a first direction and a second region characterized by a second gradient aperture dimension to aperture periodicity ratio in at least a second direction. The method also includes providing a substrate having an etch mask characterized by diffractive features, a first exposed region, and a second exposed region. The method further includes positioning the shadow mask adjacent the substrate. The first region is aligned with the first exposed region and the second region is aligned with the second exposed region. Additionally, the method includes exposing the substrate to a plasma etch process and etching first diffractive elements adjacent the first region. The first diffractive elements are characterized by a first gradient depth profile in the at least a first direction. Furthermore, the method includes etching second diffractive elements adjacent the second region. The second diffractive elements are characterized by a second gradient depth profile in the at least a second direction.

According to a specific embodiment of the present invention, a method of depositing a variable thickness material is provided. The method includes providing a substrate and providing a shadow mask having a first region with a first aperture dimension to aperture periodicity ratio and a second region with a second aperture dimension to aperture periodicity ratio less than the first aperture dimension to aperture periodicity ratio. The method also includes positioning the shadow mask adjacent the substrate and performing a plasma deposition process on the substrate to deposit the variable thickness material. A layer thickness adjacent the first region is greater than a layer thickness adjacent the second region.

In an embodiment, the substrate comprises a growth surface that includes a diffractive structure, which can include a diffraction grating. The variable thickness material can include a conformal layer. In another embodiment, the shadow mask comprises a plurality of apertures and a surface parallel to plurality of apertures, the substrate comprises a deposition surface, and positioning the shadow mask adjacent the substrate comprises placing the surface of the shadow mask parallel to the deposition surface. The shadow mask can be characterized by a varying aperture dimension to aperture periodicity ratio in two directions. Moreover, in an embodiment, the substrate comprises a uniform diffractive structure including a plurality of diffractive elements and the variable thickness material is characterized by a first diffractive element depth in the first region and a second diffractive element depth less than the first diffractive element depth in the second region. Furthermore, in another embodiment, the substrate comprises a uniform diffractive structure including a plurality of diffractive elements and the variable thickness material is characterized by a first diffractive element width in the first region and a second diffractive element width less than the first diffractive element width in the second region.

According to another specific embodiment of the present invention, a method of fabricating a master substrate is provided. The method includes providing a shadow mask having a first region characterized by a first gradient aperture dimension to aperture periodicity ratio in at least a first direction and a second region characterized by a second gradient aperture dimension to aperture periodicity ratio in at least a second direction. The method also includes providing a substrate having a mask characterized by diffractive features, a first exposed region, and a second exposed region. The method also includes positioning the shadow mask adjacent the substrate. The first region is aligned with the first exposed region and the second region is aligned with the second exposed region. Furthermore, the method includes exposing the substrate to at least one of a plasma coating or a deposition process and coating first diffractive elements adjacent the first region. The first diffractive elements are characterized by a first gradient depth and first line width profile in the at least a first direction. The method also includes coating second diffractive elements adjacent the second region. The second diffractive elements are characterized by a second gradient depth and second line width profile in the at least a second direction.

In an embodiment, the first gradient depth is greater than the second gradient depth. In another embodiment, the first line width profile is characterized by a first width and the second line width profile is characterized by a second width less than the first width.

Numerous benefits are achieved by way of the present disclosure over conventional techniques. For example, embodiments of the present invention provide methods and systems that adapt plasma based systems and tooling currently utilized for etching and/or deposition systems to achieve improved control of the plasma density/energy, including controlled variation in the plasma density/energy in the vicinity of the target surface. Additionally, embodiments improve the uniformity of plasma enhanced etching or deposition for current systems, including systems that have a varying level of non-uniformity due to plasma density, gas flow, and the like. Moreover embodiments of the present invention are characterized by reduced system complexity and provide a lower cost of fabricating graded pattern templates for contact based nano-lithography and micro-lithography processes. Utilizing readily available materials and systems, embodiments of the present invention enable the fabrication of masks/templates and materials that can be used to vary the plasma density/energy in a controlled fashion. Additionally, embodiments can produce nano/micro structures with gradually changed depth. Utilizing the shadow masks described herein, a variable depth structure can be achieved with a single etch step, avoiding multiple lithography-etch processes, thereby saving both time and cost. These and other embodiments of the disclosure along with many of its advantages and features are described in more detail in conjunction with the text below and attached figures.

BRIEF DESCRIPTION OF THE DRAWINGS

FIG. 3B is a close up view of a portion of regions illustrated in FIG. 3A according to an embodiment of the present invention.

FIG. 3C is a close up view of a portion of regions illustrated in FIG. 3A in another embodiment of the present invention.

FIGS. 4B-4D are illustrations of SEM cross-sections of grating teeth at the three measurement locations shown in FIG. 4A.

DETAILED DESCRIPTION OF SPECIFIC EMBODIMENTS

In some conventional diffraction-based waveguide optical displays, nano-/micro-grating patterns of fixed height are utilized. However, depending on the angle of incidence of the light as it interacts with the grating pattern, the light intensity outcoupled toward a user's eye can vary significantly. For example, the light intensity may be non-uniform as measured across the user's field of view in the near-field and/or the far-field images.

Embodiments of the present invention improve the user experience by decreasing non-uniformities in the image intensity through utilization of a waveguide structure with varying, for example, gradually varying, diffractive element depth (e.g., grating depth) as a function of position. These nano-scale adjustments effectively tune the diffraction efficiency to provide a more uniform view for the user.

Figures 1A, 1B:
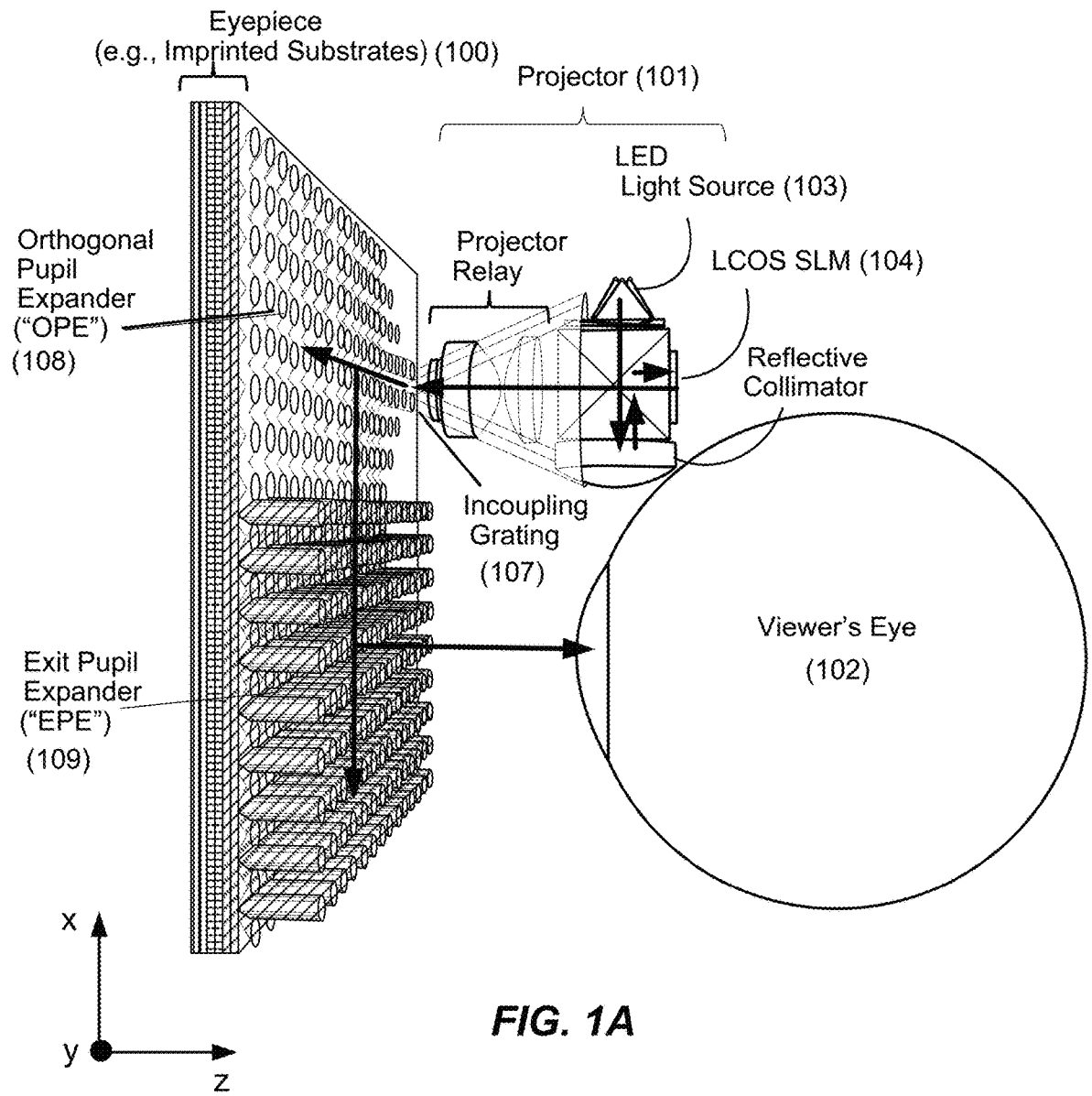
FIG. 1A illustrates schematically the light paths in a viewing optics assembly (VOA) that may be used to present a digital or virtual image to a viewer, according to an embodiment described herein.
FIG. 1B is a simplified cross-sectional view of a diffractive structure according to an embodiment of the present invention.

FIG. 1A illustrates schematically the light paths in a viewing optics assembly (VOA) that may be used to present a digital or virtual image to a viewer, according to one embodiment. The VOA includes a projector 101 and an eyepiece 100 that may be worn by a viewer. In some embodiments, the projector 101 may include a group of red LEDs, a group of green LEDs, and a group of blue LEDs. For example, the projector 101 may include two red LEDs, two green LEDs, and two blue LEDs. The eyepiece 100 may include one or more eyepiece layers. In one embodiment, the eyepiece 100 includes three eyepiece layers, one eyepiece layer for each of the three primary colors, red, green, and blue. In another embodiment, the eyepiece 100 may include six eyepiece layers, one set of eyepiece layers for each of the three primary colors configured for forming a virtual image at one depth plane, and another set of eyepiece layers for each of the three primary colors configured for forming a virtual image at another depth plane. In yet another embodiment, the eyepiece 100 may include three or more eyepiece layers for each of the three primary colors for three or more different depth planes. Each eyepiece layer includes a planar waveguide and may include an incoupling grating (ICG) 107, an orthogonal pupil expander (OPE) region 108, and an exit pupil expander (EPE) region 109.

The projector 101 projects image light onto the ICG 107 in an eyepiece 100. The ICG 107 couples the image light from the projector 101 into the planar waveguide propagating in a direction toward the OPE region 108. The waveguide propagates the image light in the horizontal direction by total internal reflection (TIR). The OPE region 108 also includes a diffractive element that multiplies and redirects image light from the ICG 107 propagating in the waveguide toward the EPE region 109. In other words, the OPE region 108 multiplies beamlets in an orthogonal direction that are delivered to the different portions of the EPE. The EPE region 109 includes a diffractive element that outcouples and directs a portion of the image light propagating in the waveguide toward a viewer's eye 102. In this fashion, an image projected by projector 101 may be viewed by the viewer's eye 102.

As described above, image light generated by the projector 101 may include light in the three primary colors, namely blue (B), green (G), and red (R). Such image light can be separated into the constituent colors, so that image light in each constituent color may be coupled to a respective waveguide in the eyepiece. Embodiments of the present disclosure are not limited to the use of the illustrated projector and other types of projectors can be utilized in various embodiments of the present disclosure.

Although a projector 101 including an LED light source 103 and a liquid crystal on silicon (LCOS) spatial light modulator (SLM) 104, embodiments of the present disclosure are not limited to this projector technology and can include other projector technologies, including fiber scanning projectors, deformable mirror devices, micro-mechanical scanners, use of laser light sources rather than LEDs, other arrangements of optics, waveguides, and beamsplitters including front lit designs, and the like.

In some eyepiece layers, the grating structures can have a spatially homogeneous diffraction efficiency and optical phase over the full surface of the grating structure. In the case of the OPE as illustrated in FIG. 1A, this invariance can lead to coherent artifacts when the substrate is substantially flat. These coherent artifacts result from interference effects related to the multiple propagation paths that light can take within the OPE grating region, which can be manifested as strongly modulated output intensity at the exit of the grating region. These modulations produce dark bands in the output image produced by the eyepiece, often referred to as "striations," which occur for different angles as the observation position is changed. Additionally, invariance in the diffraction efficiency can result in an exponentially decreasing output intensity as a function of propagation distance into the grating structure.

Accordingly, embodiments of the present invention reduce these and other image artifacts by varying the diffraction efficiency as a function of position to reduce or eliminate these interference effects. As described herein, variation of the diffraction efficiency, also referred to as coupling efficiency, can be achieved by modifying the grating height as a function of position, which results in a variation in diffraction efficiency as desired. For example, a variable distribution of the grating height in the OPE will perturb the optical phase and will reduce interference-based image artifacts of the output image as the coherence among all the possible optical paths in the OPE is reduced. Furthermore, a graded variation of the height of the gratings in the EPE will result in increased brightness uniformity across the field of view in the output image and the brightness uniformity across different eye positions, thereby preventing intensity drop off as a function of position as light propagates through the gratings, which is characteristic of uniform diffraction efficiency structures.

FIG. 1B is a simplified cross-sectional view of a diffractive structure according to an embodiment of the present invention. As illustrated in FIG. 1B, the diffractive elements (i.e., grating teeth) are characterized by a varying depth/height as a function of position measured along the x-axis. As discussed above, if a diffraction structure as illustrated in FIG. 1B is utilized in the EPE section of the eyepiece illustrated in FIG. 1A, the intensity of light outcoupled as a function of position, which could drop off with position using a conventional grating, can be characterized by increased uniformity, improving the user's experience.

If a grating structure is fabricated using a template, the gradation of the grating depth illustrated in FIG. 1B can be selectively tuned for an imprinted waveguide in the template during the template etching process. If the grating structure is fabricated directly, the gradation of the grating depth can be selectively tuned during fabrication (e.g., during etching) using the methods and systems described herein. In an embodiment, a structure with varying grating depth (i.e., depth is measured with respect to planar surface 160 of the substrate) is used as a master to imprint copies that will include gratings with varying height. Of course, other designs in which the master has varying grating height (i.e., height is measured with respect to a tilted plane aligned with the bottoms of the grating teeth) can be utilized.

Embodiments of the present invention overcome problems observed in conventional approaches, which do not address both the near-field and the far-field image uniformity. Additionally, in conventional approaches, including step-based (i.e., digital) variation approaches, which can be fabricated using multi-step etches or e-beam lithography followed by etching, the step-based variations result in scattering as a result of the digital steps and/or sharp boundaries between steps of different size. Using embodiments of the present invention, predetermined analog variations in the depth of the diffractive elements as a function of position are achieved, along with benefits that are not available from conventional step-based variation in grating depth. As described above, the methods and systems described herein enable the grating coupling coefficient to be varied as a function of position, improving brightness uniformity and the user experience.

Figure 2:
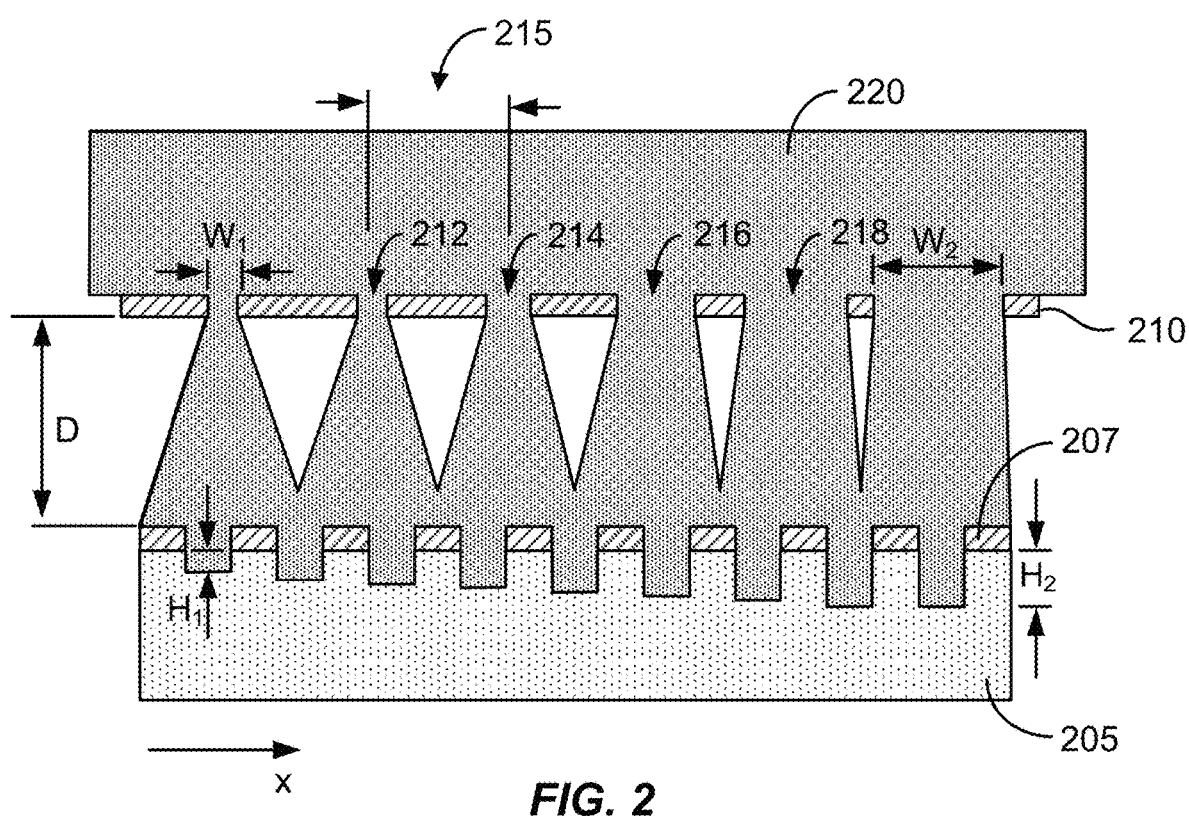
FIG. 2 is a simplified cross-sectional diagram illustrating variable depth etching using a shadow mask according to an embodiment of the present invention.

FIG. 2 is a simplified cross-sectional diagram illustrating variable depth etching using a shadow mask according to an embodiment of the present invention. In FIG. 2, a shadow mask 210 is placed in proximity to a substrate 205 on which an etch mask 207 has been patterned. The etch mask 207 can be referred to as a hard mask. In some embodiments, the plane of the shadow mask in which apertures lie is positioned parallel to the top surface of the substrate and the distance D between the shadow mask and the top surface of the etch mask can range from about 100 µm to several centimeters, for example, about 1 mm. Plasma 220 passes through shadow mask 210 and etching of the substrate 205 results at the parts of the substrate not covered by etch mask 207. It will be appreciated that the dimensions of the etch mask 207 will typically be on the order of sub-micron geometries. Accordingly, FIG. 2 is not drawn to scale since the center-to-center spacing between apertures and the aperture dimensions are orders of magnitude larger than the etch mask dimensions.

The shadow mask 210 has been fabricated such that it has apertures 212, 214, 216, and 218, which vary in dimension as a function of the x-direction. As illustrated in the example shown in FIG. 2, aperture 212 has a width of 30 µm, aperture 214 has a width of 60 µm, aperture 216 has a width of 90 µm, and aperture 218 has a width of 120 µm. In this example, the center-to-center spacing 215 of the apertures is 150 µm, but this is not required by the present invention and other spacing between apertures and aperture widths can be utilized. As a result of the varying aperture dimension, the plasma density reaching the substrate surface varies across the substrate, with higher plasma density adjacent wider aperture 218 and lower plasma density adjacent narrower aperture 212. The plasma density will be impacted by diffusion processes. As a result, although the apertures have distinct dimensions, spreading of the plasma in the x-direction and the y-direction will result in a generally continuous variation in plasma density as a function of position across the substrate surface. It will be obvious to one of skill in the art that the four apertures 212-218 are illustrated to exemplify varying size apertures as a function of position and the present invention is not limited to this small number of apertures. Rather, numerous apertures, each varying by a small amount will be used to provide a series of apertures with increasing width, for example, ~65 apertures on 150 µm centers, could be used to vary the aperture width from 30 µm to 120 µm, which can have an increase in width from aperture to aperture on the order of a micron. In FIG. 2, the variation of the aperture size in relation to the mask periodicity is linear as a function of position (i.e., in the x-direction), but this is not required by the present invention. In other implementations, the variation with position is non-linear. Since the density of plasma at the etch surface is a function of the size and spacing of the apertures in shadow mask, in addition to utilizing apertures of varying size with equal spacing between apertures, other embodiments can vary the spacing between apertures with equal size apertures. Moreover, both aperture size and spacing can be varied to achieve the desired ratio of aperture to mask area and the resulting desired plasma density at the substrate surface. One of ordinary skill in the art would recognize many variations, modifications, and alternatives.

As will be evident to one of skill in the art, the chemical/physical etch rate, which impacts the grating depth, is a function of the plasma density reaching the substrate surface. Therefore, as illustrated in FIG. 2, the grating depth $H_2$ adjacent wider aperture 218 is greater than the grating depth $H_1$ adjacent narrower aperture 212. Accordingly, embodiments of the present invention utilize shadow masks to generate varying plasma density as a function of position, which results in variation, which may be a gradual or analog variation, in diffractive element depth/height as a function of position across a substrate. After etching of the diffractive elements (e.g., grating teeth), the etch mask 207 can be removed.

Although variation in a single direction (i.e., the x-direction) is illustrated in FIG. 2, embodiments of the present invention are not limited to this example and variations in two dimensions (e.g., both the x-direction and the y-direction) are included within the scope of the present invention. Moreover, while FIG. 2 shows an approximately linearly increasing grating depth from left to right, it is possible for the grating depth to vary in another predetermined manner to achieve a desired depth profile. For example the grating depth may vary in a linear decrease, a linear increase, non-linearly, sinusoidally, with varying depths (e.g., a deep grating following by a shallower grating followed by a deeper grating, or any particular pattern), and the like. In some embodiments, these varying grating depth profiles may be controlled by the spacing of the apertures of the shadow used to create the grating, and/or by the etch rate of the etchant used to create the grating. One of ordinary skill in the art would recognize many variations, modifications, and alternatives.

Moreover, although FIG. 2 illustrates a structure in which a hard mask for the diffractive elements is patterned, then the shadow mask is utilized to form diffractive elements of varying depth, this is not required by the present invention. Other embodiments can utilize a process flow in which diffractive elements (e.g., a uniform grating pattern) are formed, the hard mask is removed, and the shadow mask is then used to selectively remove portions of the diffractive elements to form a diffractive structure with varying height. An etch mask can be utilized in embodiments where varying depth is desired. Additionally, although a periodic diffraction grating structure is defined by etch mask 207 in FIG. 2 as an illustrative example, this is not required by the present invention and other nanostructures are included within the scope of the present invention, including pillars or holes (of different cross sectional shapes, including circles, polygons, and the like), discontinuous gratings, sinusoidal wavy lines and spaces, line segments, or the like.

The shadow mask can be fabricated using a variety of materials that are etch-resistant in a plasma etch environment and provide mechanical rigidity. For example, the shadow mask can be fabricated using a silicon wafer that is patterned using photolithography and then etched to provide variable size openings across the wafer surface. Laser ablation of portions of a silicon wafer can also be used to fabricate the shadow mask. A stainless steel mesh or an anodized aluminum mesh can also be formed and used as the shadow mask. In addition, a protective coating including, for example, $Al_2O_3$, $SiO_2$, ZnO, $TiO_2$, Au, Ag, Cu, Pt, Ir, or the like can be formed over the mesh (e.g., silicon) to protect materials that it is not preferable to etch.

Some embodiments of the present invention are discussed in relation to use during dry etch processes, but embodiments of the present invention are applicable to a wide variety of semiconductor fabrication processes in which diffusive control of the etching/growth environment is utilized to vary the fabrication process as a function of position, including other plasma etch processes. As further examples, embodiments of the present invention are applicable to plasma deposition (e.g., sputter, chemical vapor deposition (CVD), low pressure CVD (LP-CVD), plasma-enhanced CVD (PECVD), or the like) to form features of varying height, wet etch processes including metal-assisted chemical etching, other fabrication processes in which the precursor concentration or concentration of chemical species at the surface impacts deposition/etch rates, and the like.

Figure 3A:
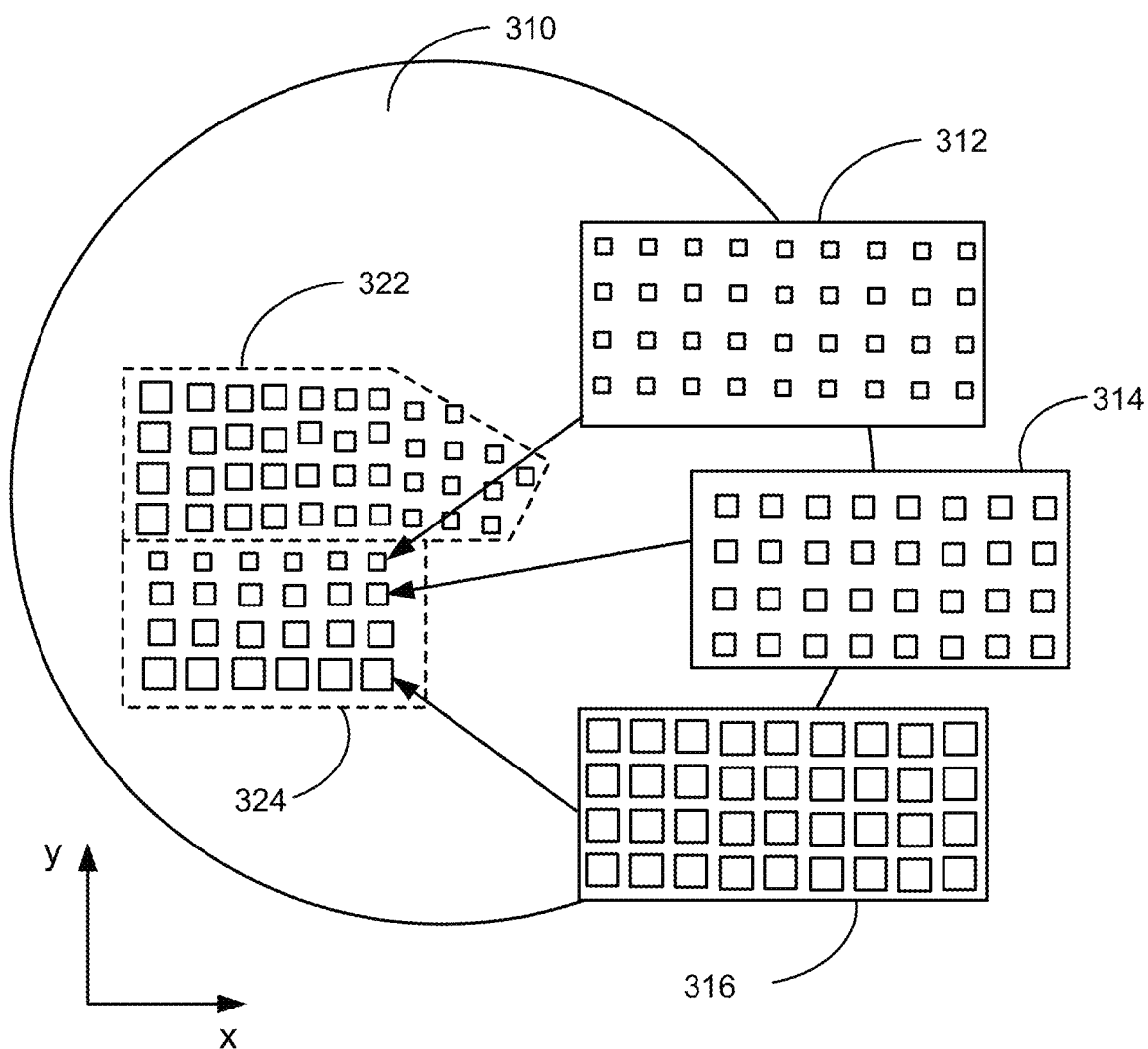
FIG. 3A is a simplified plan view of a substrate and exemplary shadow mask features according to an embodiment of the present invention.

FIG. 3A is a simplified plan view of a substrate and exemplary shadow mask features according to an embodiment of the present invention. The example shadow mask 310 illustrated in FIG. 3A illustrates how differing aperture size as a function of x, y position can be used to vary etch depth and the specific apertures illustrated do not limit embodiments of the present invention. In FIG. 3A, three different regions of a shadow mask 310 are illustrated, a first region 312 with small apertures, a second region 314 with intermediate apertures, and a third region 316 with large apertures.

In the example shadow mask 310 illustrated in FIG. 3A, the center-to-center spacing between apertures, also referred to as aperture periodicity, is 150 µm, but this is merely exemplary. Also, although the apertures in the shadow mask are illustrated as squares, this is merely exemplary and other aperture geometries can be utilized, including rectangles, polygons, circles, ovals, or the like. The apertures can range in dimensions from several microns (e.g., 10 µm) to several millimeters and the thickness of the shadow mask can range from 1 µm to several millimeters. Referring to FIG. 3A, the illustrated shadow mask is 80 µm thick, has a center-to-center spacing between apertures (i.e., aperture periodicity) of 150 µm and aperture dimensions ranging in size from 30 µm to 120 µm. Different regions of the shadow mask can be associated with different optical structures, including an orthogonal pupil expander 322 and an exit pupil expander 324. For example, one or more regions of the shadow mask can be associated with one or more optical structures.

Referring to FIG. 3A, each region of the shadow mask can be characterized by an aperture dimension to aperture periodicity ratio. For apertures that have equal dimensions in the x-direction and the y-direction (i.e., square or circular apertures), the aperture dimension to aperture periodicity ratio may be equal in both the x-direction and the y-direction, but this is not required by the present invention and the ratio may be different in different directions. Region 312, because of the small aperture size, has a low aperture dimension to aperture periodicity ratio, whereas, in comparison, region 316 has a higher aperture dimension to aperture periodicity ratio, given a constant aperture periodicity (i.e., a constant center-to-center spacing between apertures) between regions 312 and 316. Although the aperture dimension to aperture periodicity ratio is illustrated as uniform within each of the regions 312, 314, and 316, this is merely exemplary and it should be appreciated that the ratio can vary within each region and between regions, for example, as the sizes are gradually changed.

FIG. 3B is a close up view of a portion of regions 312 and 316 according to an embodiment of the present invention. In some embodiments, for example as shown in FIG. 3B, the aperture dimension in one region (e.g., $x_1$ in region 316a) is greater than the aperture dimension in a second region (e.g., $x_2$ in region 312a) and the center-to-center spacing of apertures (e.g., $p_1$ in regions 316a and 312a) is constant, thereby providing for a variation in ratio (e.g., $R_1$ in region 316a and $R_2$ in region 312a). FIG. 3C is a close up view of a portion of regions 312 and 316 in another embodiment of the present invention. In the embodiment illustrated in FIG. 3C, the center-to-center spacing of apertures in the first region (e.g., $p_1$ in region 316b) is smaller than the center-to-center spacing of apertures in the second region (e.g., $p_2$ in region 312b) and the aperture dimension in both regions (e.g., $x_1$ in regions 316b and 312b) is constant, thereby providing for a variation in ratio (e.g., R1 in region 316b and $R_2$ in region 312b). At different portions of the eyepiece, the ratio can vary as appropriate to the particular application. As an example, in FIG. 3, orthogonal pupil expander 322 has little to no variation in aperture dimension or periodicity, and thus has a constant ratio, in the y-direction, but an increasing aperture dimension to aperture spacing ratio in the negative x-direction. On the other hand, the exit pupil expander 324 has a substantially linear variation in the y-direction, but little to no variation in the x-direction.

Although FIG. 3A illustrates regions of the shadow mask as discrete elements, it will be appreciated that these discrete regions are only used to show sections of a continuously varying shadow mask having apertures that are gradually increasing in size from region 312 to region 316. As the aperture size increases, which is controlled during shadow mask fabrication, the plasma density at the substrate surface corresponding to region 312 of shadow mask 310 will be less than the plasma density at the substrate surface in an area corresponding to region 316 of the shadow mask 310. Accordingly, the etch rate of the substrate area corresponding to region 316 will be higher than the etch rate of the substrate area corresponding to region 312, enabling the formation of diffractive elements with varying grating depth and varying coupling coefficients as a function of position. Thus, the shadow mask with varying size apertures enables the plasma density to be tuned as a function of position, resulting in tuning of the etch depth as a function of position. Thus, the illustration in FIG. 3A of discrete regions 312, 314, and 316 is merely to illustrate that the aperture size varies (e.g., gradually) across the shadow mask, enabling the variation in etch rate and grating depth as a function of position on substrate as a result of varying plasma density as a function of position.

Figure 4A:
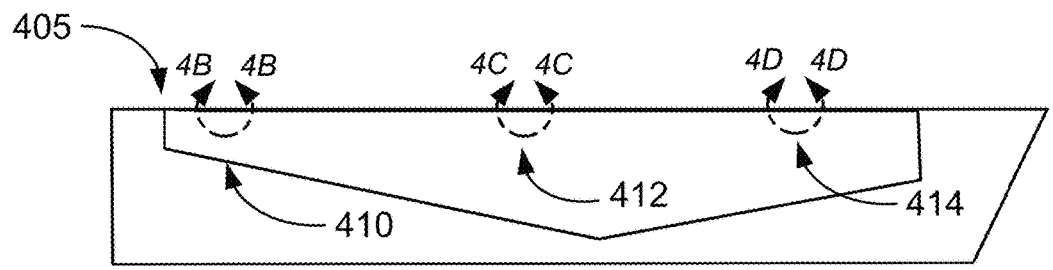
FIG. 4A is an image showing a portion of an eyepiece including a variable height grating structure according to an embodiment of the present invention.
Figure 4E:
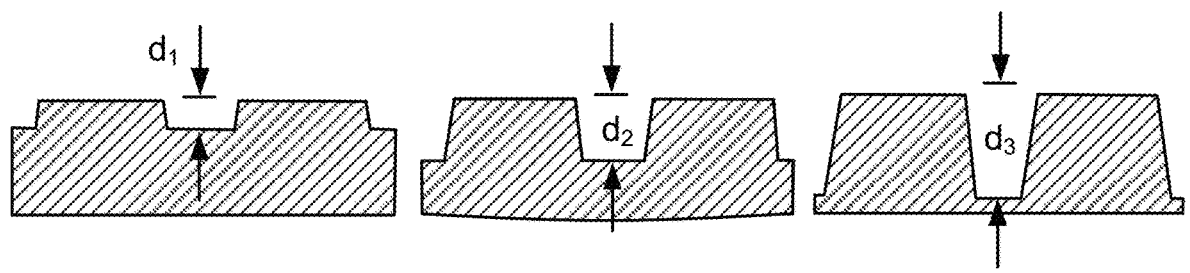
FIG. 4E is a plot illustrating grating etch depth as a function of distance from an edge of the eyepiece illustrated in FIG. 4A.
Figure 4E:
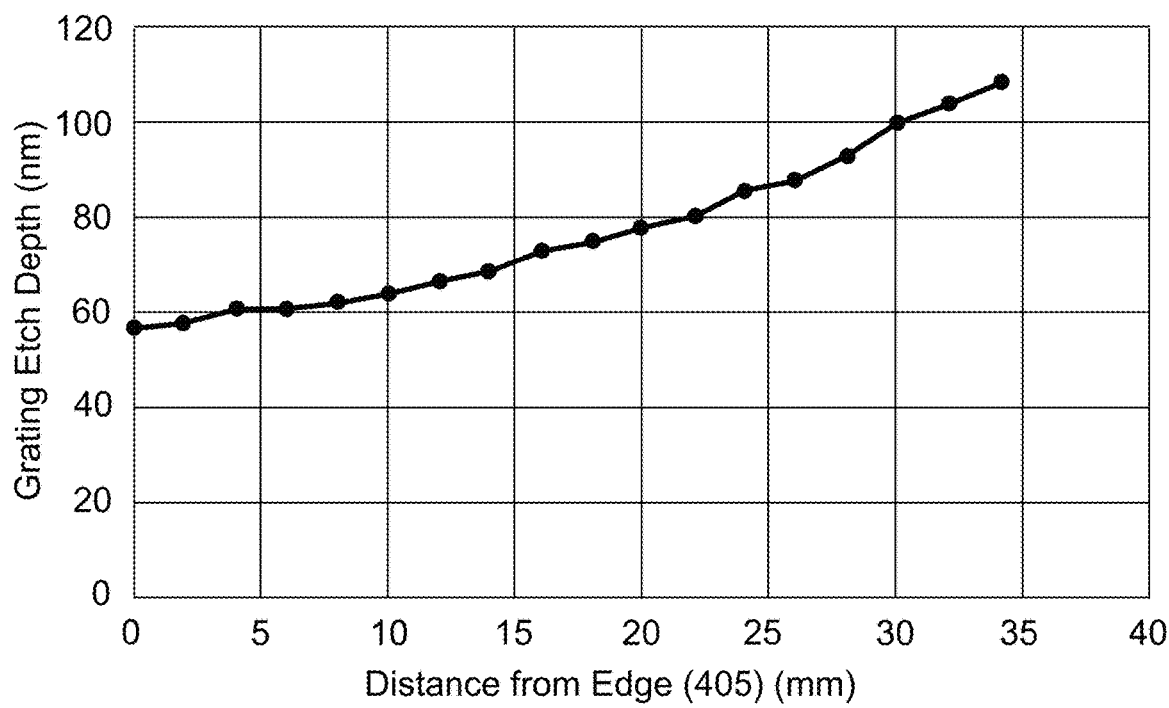

FIG. 4A is an image showing a portion of an eyepiece including a variable height grating structure according to an embodiment of the present invention. As illustrated in FIG. 4A, three measurement locations, 410, 412, and 414 are shown. FIGS. 4B-4D are illustrations of SEM cross-sections of grating teeth at the three measurement locations 410, 412, and 414, respectively, shown in FIG. 4A. FIG. 4E is a plot illustrating grating etch depth as a function of distance from an edge 405 of the eyepiece illustrated in FIG. 4A.

Referring to FIGS. 4B-4D, the grating etch depth is measured at three locations across the eyepiece. Using the shadow mask technique described herein, an analog, gradual gradient diffractive structure is fabricated. The gradient in etch depth is illustrated for a silicon wafer with a one dimensional gradient in FIGS. 4A-4E, but it will be appreciated that this is just an example and other gradient structures, including two dimensional structures can be fabricated in other materials.

In order to fabricate the structure illustrated in FIGS. 4A-4D, an etch mask of thermally grown $SiO_2$ on a silicon wafer was first etched without a shadow mask to fabricate grating teeth. Then, a shadow mask with a one-dimensional variation in aperture dimension was positioned 2 mm from the silicon wafer surface and the silicon wafer was etched. The depth of the grating etch was measured with respect to the distance from an edge 405 of the eyepiece. At location 410, a grating depth $d_1$ of ~60 nm was produced as illustrated in FIG. 4B, at location 412, a grating depth $d_2$ of ~78 nm was produced as illustrated in FIG. 4C, and at location 414, a grating depth $d_1$ of ~100 nm was produced as illustrated in FIG. 4D. The variation in grating etch depth with distance is illustrated in FIG. 4E, with grating depths ranging from about 60 nm to about 110 nm over the 35 mm size of the eyepiece. Embodiments of the present invention provide substantially gradual grating depth variation with position in contrast with conventional techniques that generally produce steps or lines that are visible across the eyepiece. Thus, embodiments of the present invention enable smooth near-field and far-field images in the virtual image displayed to a user's eye.

Figure 5A:
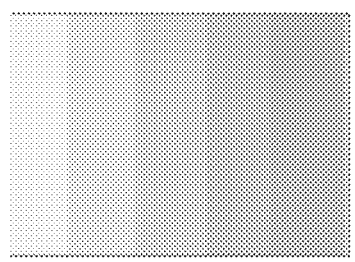
FIGS. 5A-5C are plan view diagrams illustrating diffractive structures fabricated using conventional techniques.
Figure 5B:
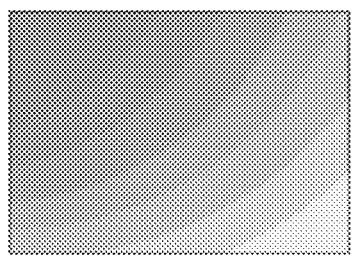
Figure 5C:
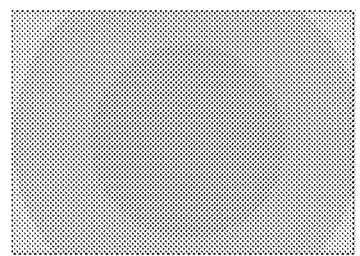
Figure 5D:
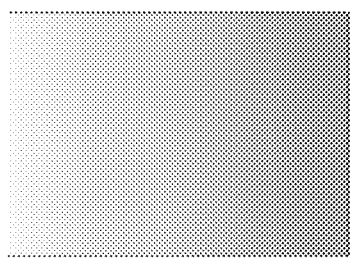
FIG. 5D-5F are plan view diagrams illustrating diffractive structures with one-dimensional or two-dimensional contours fabricated according to embodiments of the present invention.
Figure 5E:
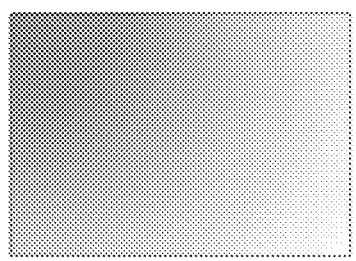
Figure 5F:
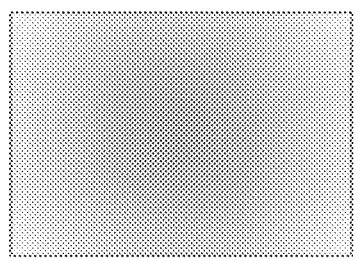

In addition to the one-dimensional variation illustrated in FIG. 1, embodiments of the present invention can utilize shadow masks with two-dimensional variation to fabricate structures characterized by blended, gradual changes in grating depth/height for 2D contours. FIGS. 5A-5C are plan view diagrams illustrating diffractive structures fabricated using conventional techniques. FIG. 5D-5F are plan view diagrams illustrating diffractive structures with one-dimensional or two-dimensional contours fabricated according to embodiments of the present invention. By controlling the size, duty-cycle (i.e., pitch) of the apertures in the shadow mask, either one-dimensional or two-dimensional patterns can be fabricated with predetermined etch depth gradients. In comparison with conventional techniques such as one-dimensional stepped contours, challenging two-dimensional contours are enabled by embodiments of the present invention. Thus, the shadow mask techniques described herein not only enable two-dimensional contouring or tailoring to specific designs based on the shadow mask aperture distribution, but can also blend boundaries to achieve predetermined gradient profiles not available using conventional techniques.

Referring to FIGS. 5A-5C, one-dimensional (FIG. 5A), two dimensional (FIG. 5B), and a circular (FIG. 5C) contours fabricated using conventional techniques, including multistep lithography/etching, are illustrated. Darker gray areas are associated with deeper etch profiles and lighter gray areas are associated with shallower etch profiles. The steps or boundaries between adjacent sections are clearly evident. During use, diffractive structures with these distinct boundaries will produce scattering or variation in far-field and/or near-field image intensity at the boundaries, thereby adversely impacting image quality and user experience. In contrast with these conventional results, embodiments of the present invention provide one-dimensional (FIG. 5D), two dimensional (FIG. 5E), and a circular (FIG. 5F) contours that vary in a gradual manner to provide a seemingly continuous gradient as a function of position.

Figure 6A:
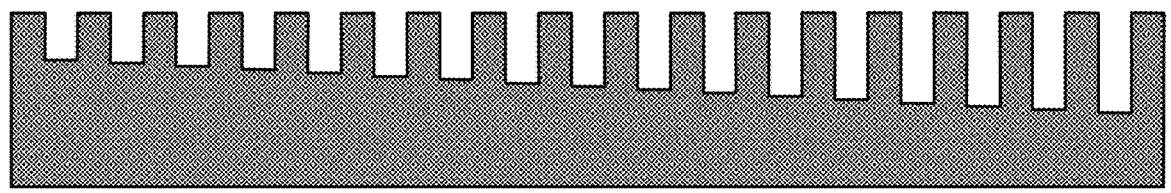
FIG. 6A is a simplified cross-sectional view of a diffractive structure with a grating height gradient according to an embodiment of the present invention.
Figure 6B:
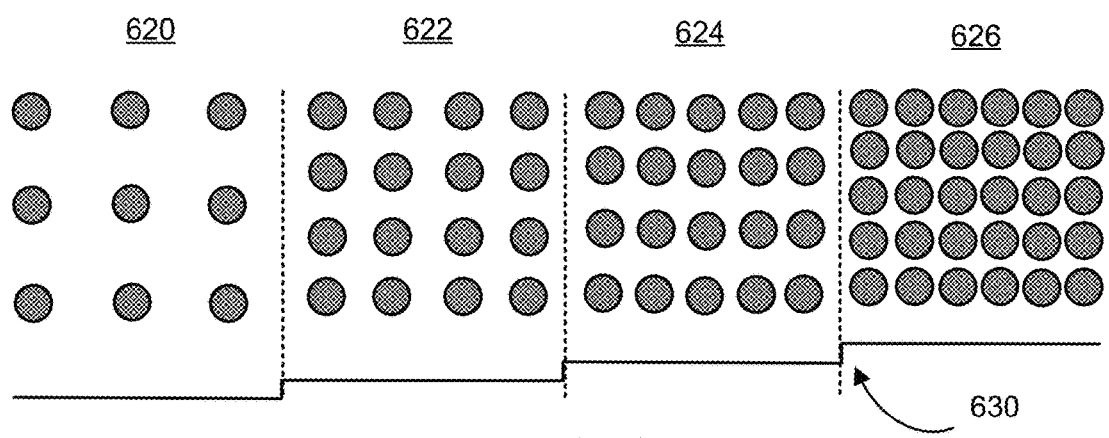
FIG. 6B is a simplified plan view illustrating a digital dispense pattern with varying dispense volume according to an embodiment of the present invention.
Figure 6C:
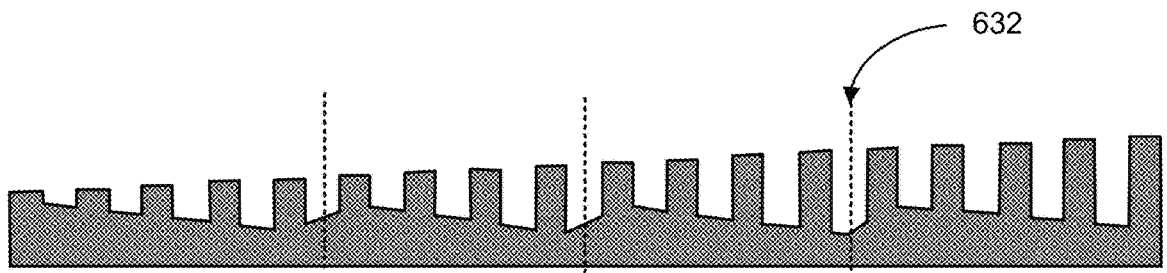
FIG. 6C is a simplified cross-sectional view of the diffractive structure illustrated in FIG. 6A with blended interface regions according to an embodiment of the present invention.

FIG. 6A is a simplified cross-sectional view of a diffractive structure with a grating height gradient according to an embodiment of the present invention. FIG. 6B is a simplified plan view illustrating a digital dispense pattern with varying dispense volume according to an embodiment of the present invention. FIG. 6C is a simplified cross-sectional view of the diffractive structure illustrated in FIG. 6A with blended interface regions according to an embodiment of the present invention.

Referring to FIG. 6A, the diffractive structure includes grating teeth with varying depth as described herein. This structure, which can also include variation in a second dimension can be fabricated using the techniques described herein. In some embodiments, the diffractive structure is fabricated in silicon, $SiO_2$, or the like and will be used as a template in a nano-imprinting lithography process, for example, a Jet and Flash Imprint Lithography (J-FIL) process. As illustrated in FIG. 6B, a resist pattern, or other suitable liquid, can be dispensed with a drop pattern via a print head, which can utilize hundreds of nozzles. Accordingly, the dispense pattern can include drops with a tunable finite volume. However, in some implementations, the drop volume cannot be adjusted continuously. In FIG. 6B, the liquid volume is dispensed in a digital dispense pattern, with a predetermined volume in each of section 620, 622, 624, and 626. For example, if the drop volume is 1 pL, section 620 would have 9 pL of liquid, section 622 would have 16 pL of liquid, section 624 would have 25 pL of liquid, and section 626 would have 36 pL of liquid. Accordingly, each section will have a predetermined residual layer thickness (RLT) that is a function of the drop volume and number of drops per section. After initial dispense is completed, the differing volumes in each section will result in steps 630 between adjacent section.

Referring to FIG. 6C, a cross-section of a diffractive grating is shown that may be formed by imprinting a volume of patterned drops, such as that shown in FIG. 6B, using an analog gradient template, such as that shown in FIG. 6A. During imprinting, as the liquid spreads in each section, and across section by diffusion, the RLT near the section edges, rather than be discontinuous, will vary smoothly as illustrated in FIG. 6C. Accordingly, the spreading of the liquid (e.g., resist) at the edges of the section boundaries, for example, boundary 632 will result in blending of RLT at the interface region between sections. As a result of the smooth transition at section boundaries, optical scattering at the boundaries will be reduced in comparison to structures with discrete boundaries. The variation in grating teeth height, as measured relative to a base of a substrate, from shallower to deeper will correlate with the increased liquid volume from section 620 to section 626.

Figure 7:
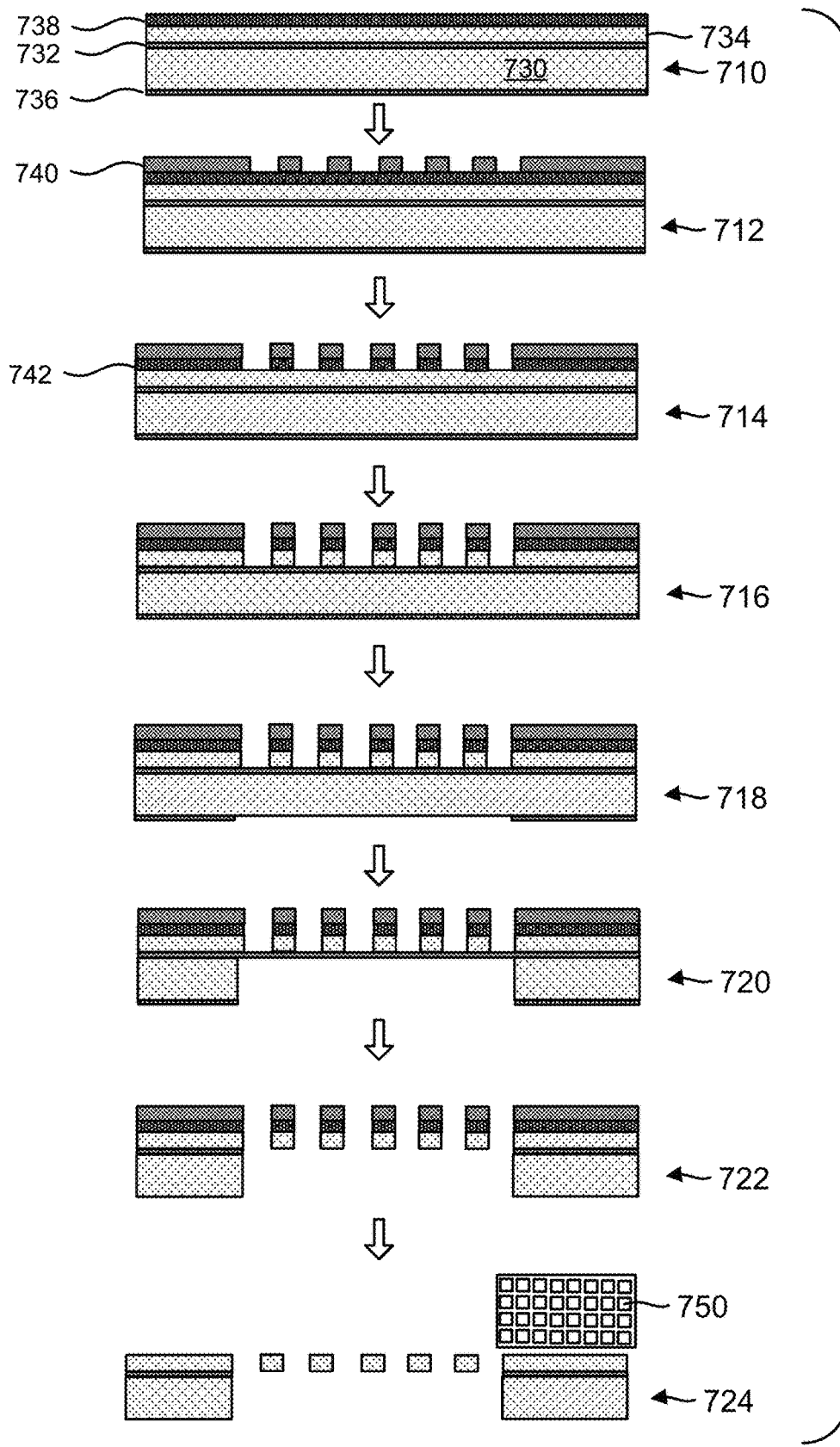
FIG. 7 illustrates a simplified process flow diagram illustrating a method of fabricating a shadow mask according to an embodiment of the present invention.

FIG. 7 illustrates a simplified process flow diagram illustrating a method of fabricating a shadow mask according to an embodiment of the present invention. The process starts with a silicon-on-insulator (SOI) substrate on which a chrome etch mask layer 738 is deposited (710). The SOI substrate includes silicon handle wafer 730, buried oxide layer 732, single crystal silicon layer 734, and a backside oxide layer 736. Although a silicon shadow mask is illustrated in this process flow, this is not required by the present invention and other materials including $SiO_2$, metals, other dielectric materials, and the like are suitable for use as shadow masks.

A patterning layer 740 is formed on the chrome layer 738 and the patterning layer (e.g., photoresist) is patterned with predetermined aperture sizes (712). As described below, the apertures, which vary in size as a function of position, are defined in this process step. Using the patterned patterning layer, the chrome layer 738 is etched, for example, using a dry etch process, to transfer the pattern in the patterning layer into the chrome layer (714), which will be used as a hard mask in subsequent etch processes.

For etching of the single crystal silicon layer 734, the patterned chrome layer 742 serves as a hard mask, for example, during plasma etching, and the pattern in the chrome layer will be transferred during etching into the single crystal silicon layer (716). As illustrated in process step 716, the silicon etch process is terminated upon reaching the buried oxide layer 732.

In order to define the lateral dimensions of the shadow mask, the backside oxide layer 736 is patterned (718). This opening is then used to etch the silicon handle wafer 730 using a deep etch (e.g., dry etch) that terminates at the buried oxide layer 732 (720). The thickness of the silicon handle wafer (e.g. on the order of 80 μm to 800 μm, for example, 500 μm), provides mechanical strength and rigidity to the shadow mask. The buried oxide layer 732 is then removed, leaving a grid or mesh pattern in the single crystal silicon layer 734 (722). The fabrication process is completed by removing the remaining portions of the chrome hard mask and the patterning layer (724). The inset 750 illustrates in a plan view the apertures in the grid pattern illustrated at process step 724). As will be evident to one of skill in the art, the dimensions of the apertures vary across the shadow mask and the uniformity in aperture size illustrated in inset 750 is merely to illustrate a portion of the shadow mask since the aperture size can change, for example, slowly, across the structure. Additionally, although an SOI substrate is used in the exemplary process flow illustrated in FIG. 7, other materials and processes can be used and are included in the scope of the present invention.

For example, although dry etching is illustrated in FIG. 7, other implementations utilize a wet etch process in which the silicon can be anisotropically etched using KOH to generate holes on a wafer/sheet. Other metals and dielectric materials can also be wet etched, either anisotropically or isotropically. Moreover, laser drilling/ablation can be used, for example, a laser can be used to drill holes in silicon, metal, glass, or other dielectric materials with submicron precision, which is adequate for apertures on the order of greater than a micron. Additionally, Metal assisted Chemical Wet etch (MaCe) processes can be used, for example, gold (Au) can be used to assist silicon wet etching to produce anisotropic etching.

Figure 8:
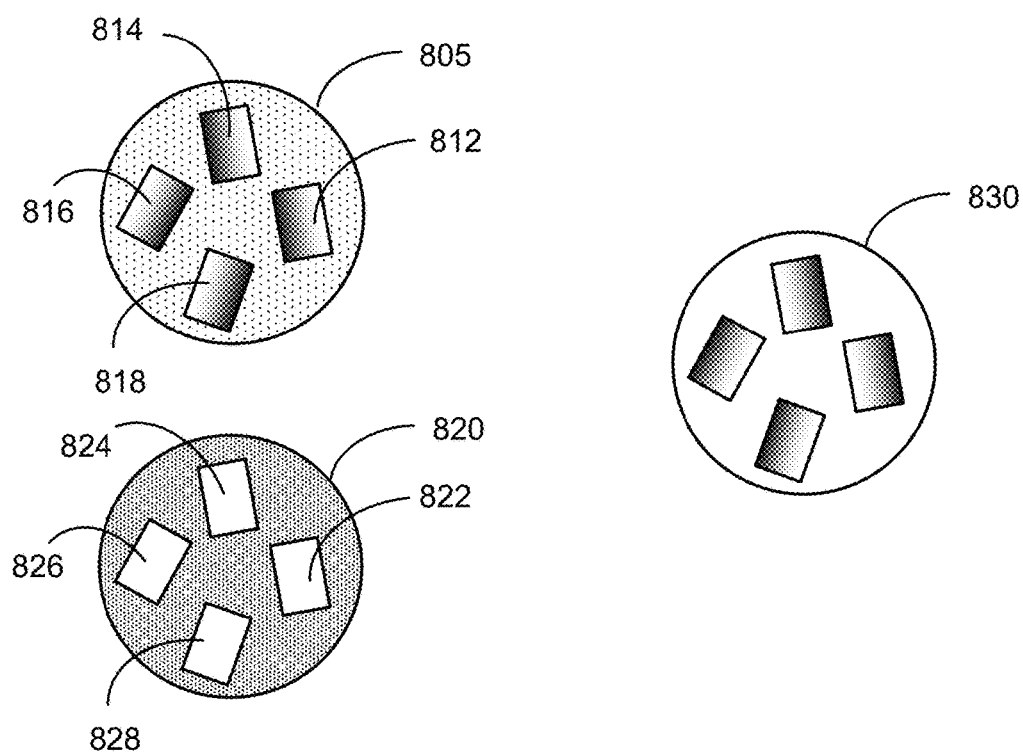
FIG. 8 is simplified diagram illustrating use of a shadow mask master to produce a substrate with variable depth diffraction elements according to an embodiment of the present invention.

FIG. 8 is simplified diagram illustrating use of a shadow mask master to produce a substrate with variable depth diffraction elements according to an embodiment of the present invention. In FIG. 8, a shadow mask master 805 with gradient duty cycle apertures is placed adjacent a substrate 820. The shadow mask master 805 in this example, includes four regions 812, 814, 816, and 818, which each have varied aperture sizes to produce the gradient duty cycle apertures, with lighter colors representing a larger duty cycle similar to the region 316 illustrated in FIG. 3A and darker colors representing a smaller duty cycle similar to the region 312 illustrated in FIG. 3A. In one example, four different eyepieces can be patterned using the shadow mask master.

Substrate 820 is etched to form a master substrate 830. As illustrated in FIG. 8, the shadow mask master 805 is aligned adjacent (e.g., on top of) a substrate 820, which is generally protected with resist and exposed in four regions 822, 824, 826, and 828 that correspond to regions 812, 814, 816, and 818 in the shadow mask master 805. In FIG. 8, the darker regions on the master substrate 830 represent deeper etch depth. By tailoring specific aperture sizes and varying the duty cycle on the shadow mask master, the target etch depth gradients can be etched into the substrate 820 to form a multi-field master substrate 830. The master substrate 830 can then be used as a master template for contact based nano-lithography processes (for example, J-FIL) to imprint over high index substrates and thus used as waveguides, or as a shadow mask in directly etching the high index layer or substrates to be used as optical waveguides.

Figure 9:
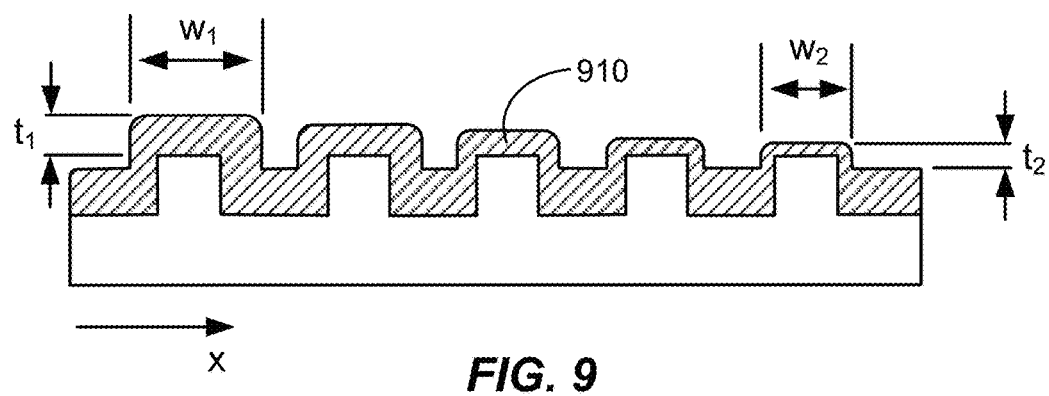
FIG. 9 is a simplified cross-sectional diagram illustrating a variable thickness deposited layer according to an embodiment of the present invention.

FIG. 9 is a simplified cross-sectional diagram illustrating a variable thickness deposited layer according to an embodiment of the present invention. In FIG. 9, a shadow mask (not shown) has been applied to a deposition process to fabricate a gradually varying deposited layer 910 with a first thickness $t_1$ in a first region and a second thickness $t_2$ in a second region. As illustrated in FIG. 9, the deposited layer in regions adjacent the portions of the shadow mask with a higher aperture dimension to aperture periodicity ratio have a greater thickness than the deposited layer in regions adjacent the portions of the shadow mask with a lower aperture dimension to aperture periodicity ratio. Therefore, starting with grating elements of uniform height, the shadow mask techniques described herein are useful for forming diffractive elements characterized by a first gradient depth in a first region and a second gradient depth in a second region as a result of the variation in deposition layer thickness as a function of position. Moreover, as illustrated in FIG. 9, the diffractive elements in the first region are characterized by a line width profile $w_1$, measured in the x-direction, that is wider than a line width profile $w_2$ in the second region. As a result, the diffractive elements provided by embodiments of the present invention can include variation in both depth and width as a function of position that are related to the shadow mask aperture dimension to aperture periodicity ratio.

Numerous plasma assisted deposition processes can be implemented using embodiments of the present invention, including, for example, Atmospheric Plasma Enhanced CVD (APPECVD), conventional physical deposition processes such as sputter deposition and evaporation. The placement of the shadow mask adjacent the substrate on which the deposited layer is formed will result in variation in the coating/deposition thickness, with areas having larger apertures being coated with a thicker coating, whereas areas having smaller apertures being coated with a thinner coating for a similar aperture pitch. Accordingly, a gradient in coating thickness is produced that is not easily produced using conventional deposition techniques. In FIG. 9, a conformal coating produced using an APPECVD or sputter process is illustrated over nano-patterns, which can be diffraction gratings or other suitable diffractive structures.

Figure 10:
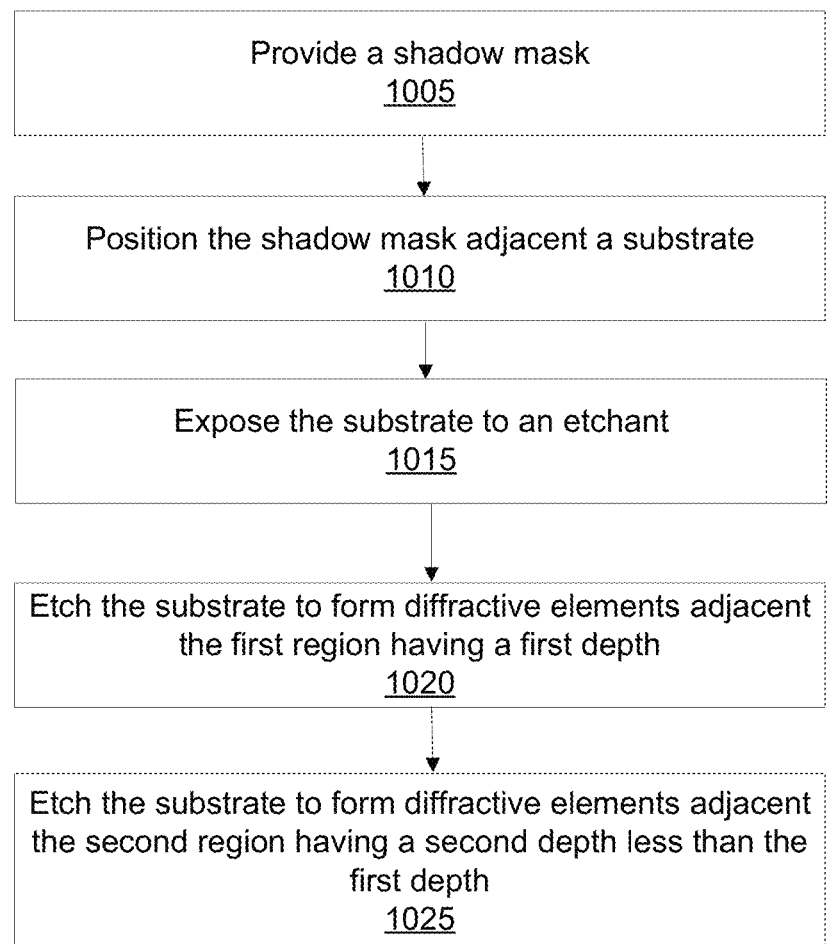
FIG. 10 is a flowchart illustrating a method of fabricating a diffractive structure with varying diffractive element depth according to an embodiment of the present invention.

FIG. 10 is a flowchart illustrating a method of fabricating a diffractive structure with varying diffractive element depth according to an embodiment of the present invention. The method comprises providing a shadow mask at step 1005. The shadow mask may have a first region with a first aperture dimension to aperture periodicity ratio and a second region with a second aperture dimension to aperture periodicity ratio. The second aperture dimension to aperture periodicity ratio may be less than the first aperture dimension to aperture periodicity ratio. In some embodiments, the first aperture dimension to aperture periodicity ratio and the second aperture dimension to aperture periodicity ratio are defined by a first aperture dimension in the first region greater than a second aperture dimension in the second region and a constant center-to-center spacing of apertures. In some embodiments, the first aperture dimension to aperture periodicity ratio and the second aperture dimension to aperture periodicity ratio are defined by a first center-to-center spacing of apertures in the first region and a second center-to-center spacing of apertures in the second region and a constant aperture dimension. As used herein, the aperture periodicity may also be referred to as center-to-center aperture spacing.

The method further comprises positioning the shadow mask adjacent a substrate at step 1010. In some embodiments, the shadow mask is characterized by an aperture dimension to aperture periodicity ratio that varies linearly across the shadow mask. The shadow mask may be fabricated using etch-resistant materials and may include a protective coating to protect materials that are not preferable to etch.

In some embodiments, the substrate may comprise a silicon substrate. In other embodiments, the substrate may comprise any suitable material that may be etched. The substrate may comprise an etch mask corresponding to the diffractive structure. The etch mask may also be referred to herein as a hard mask. In some embodiments, the diffractive structure may comprise a diffraction grating and the diffractive elements comprise grating teeth.

The method further comprises exposing the substrate to an etchant at step 1015. In some embodiments, exposing the substrate to an etchant may comprise performing a plasma etch process. For example, plasma may pass through the shadow mask and etch the substrate at the parts not covered by the etch mask. In other embodiments, any suitable etchant may be used that is capable of etching the material selected for the substrate.

The method further comprises etching the substrate to form diffractive elements adjacent the first region having a first depth at step 1020. The method further comprises etching the substrate to form diffractive elements adjacent the second region having a second depth less than the first depth at step 1025. In some embodiments, the diffractive elements vary nonlinearly. In some embodiments, the first depth and the second depth may range from about 10 nm to about 150 nm. The first and second depth may vary due to apertures of varying size in the shadow mask, allowing more or less amounts of etchant to come into contact with the substrate.

In some embodiments, the method further comprises removing the etch mask after etching diffractive elements in the first region and etching diffractive elements in the second region. In some embodiments, the method further comprises performing a plasma enhanced coating process on the substrate.

It should be appreciated that the specific steps illustrated in FIG. 10 provide a particular method of fabricating a diffractive structure with varying diffractive element depth according to another embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11:
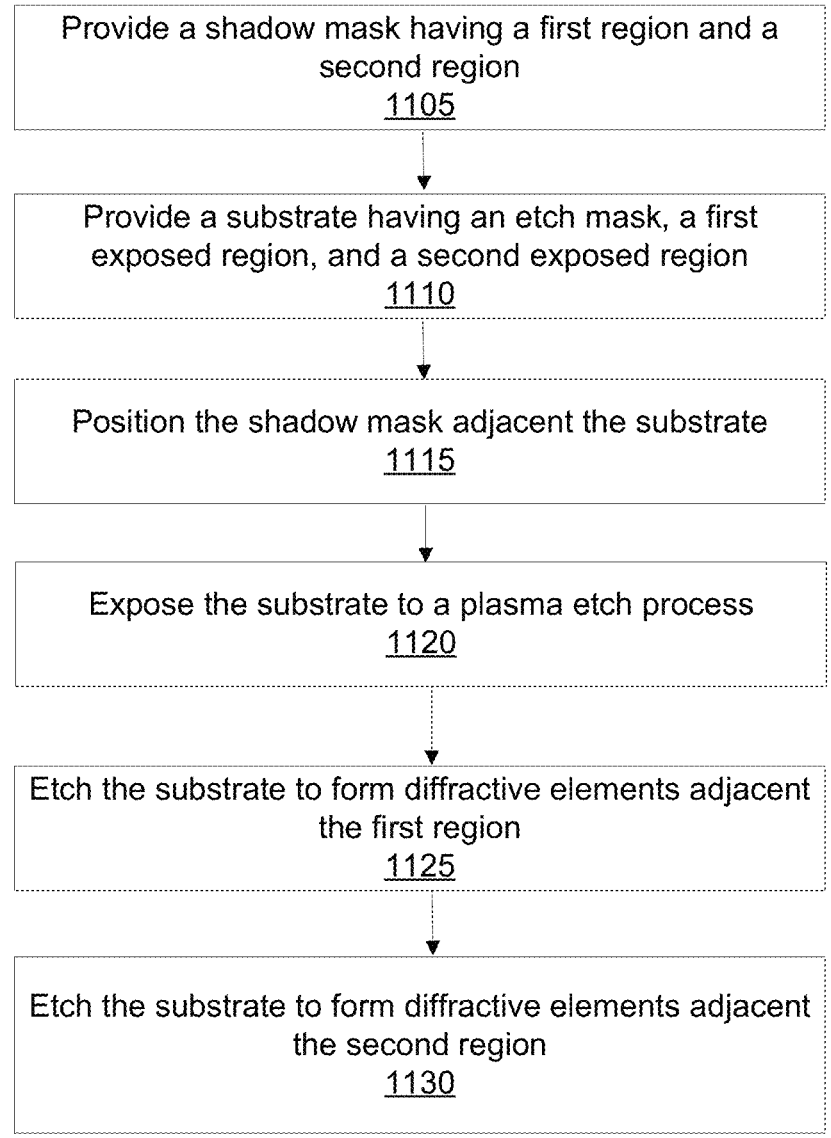
FIG. 11 is a flowchart illustrating a method of fabricating a master substrate according to an embodiment of the present invention.

FIG. 11 is a flowchart illustrating a method of fabricating a master substrate according to an embodiment of the present invention. The method comprises providing a shadow mask having a first region and a second region at step 1105. The first region may be characterized by a first gradient aperture dimension to aperture periodicity ratio in at least a first direction. The second region may be characterized by a second gradient aperture dimension to aperture periodicity ratio in at least a second direction. The shadow mask may comprise any suitable etch-resistant material. Aperture periodicity may also be referred to as center-to-center aperture spacing herein.

In some embodiments, the first gradient aperture dimension to aperture periodicity ratio is equal to the second gradient aperture dimension to aperture periodicity ratio, and the first direction and the second direction are a same direction. In some embodiments, the first gradient aperture dimension to aperture periodicity ratio may be defined by a constant center-to-center spacing of apertures and a graded aperture dimension along the first direction, and the second gradient aperture dimension to aperture periodicity ratio may be defined by a constant center-to-center spacing of apertures and a graded aperture dimension along the second direction. In some embodiments, the first gradient aperture dimension to aperture periodicity ratio may be defined by a constant aperture dimension along the first direction and a graded center-to-center spacing of apertures, and the second gradient aperture dimension to aperture periodicity ratio is defined by a constant aperture dimension along the second direction and a graded center-to-center spacing of apertures.

The method further comprises providing a substrate at step 1110. The substrate may have an etch mask characterized by diffractive features, a first exposed region, and a second exposed region. The etch mask may also be referred to herein as a hard mask. In some embodiments, the substrate may comprise a silicon substrate. In some embodiments, the substrate may comprise any suitable etchable material.

The method further comprises positioning the shadow mask adjacent the substrate at step 1115. The first region may be aligned with the first exposed region and the second region may be aligned with the second exposed region. The method further comprises exposing the substrate to a plasma etch process at step 1120. According to this process, plasma may pass through the shadow mask at the parts of the substrate not covered by the etch mask.

The method further comprises etching first diffractive elements adjacent the first region at step 1125. The first diffractive elements may be characterized by a first gradient depth profile in the at least a first direction. The method further comprises etching second diffractive elements adjacent the second region at step 1130. The second diffractive elements may be characterized by a second gradient depth profile in the at least a second direction. Differing depth profiles between the first diffractive elements and the second diffractive elements may result from apertures of varying size in the shadow mask used in the plasma etch process. For example, a larger aperture may allow more plasma to come into contact with the substrate, while a smaller aperture may allow less plasma to come into contact with the substrate. This may result in varying plasma density reaching the surface, creating diffractive elements of varying size and depth.

In some embodiments, the first diffractive elements and the second diffractive elements may comprise grating teeth. In some embodiments, the method further comprises removing the etch mask after etching the first diffractive elements adjacent the first region and etching the second diffractive elements adjacent the second region.

In some embodiments, the first region may be further characterized by a third gradient aperture dimension to aperture periodicity ratio in at least a direction orthogonal to the first direction, the second region may be further characterized by a fourth gradient aperture dimension to aperture periodicity ratio in at least a direction orthogonal to the second direction, the first diffractive elements are further characterized by a third gradient depth profile in the direction orthogonal to the first direction, and the second diffractive elements are further characterized by a fourth gradient depth profile in the direction orthogonal to the second direction.

It should be appreciated that the specific steps illustrated in FIG. 11 provide a particular method of fabricating a master substrate according to another embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12:
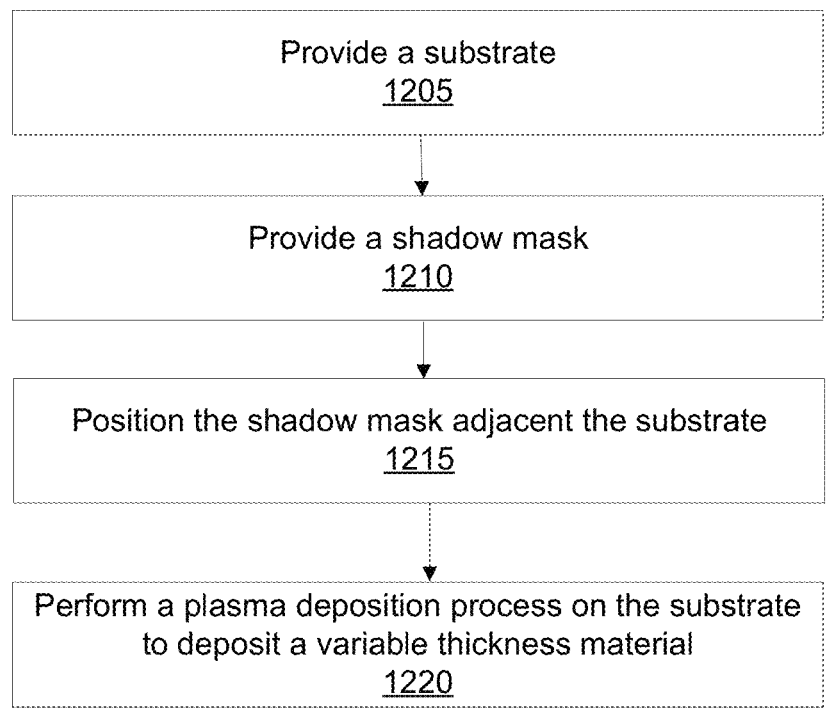
FIG. 12 is a flowchart illustrating a method of depositing a variable thickness material according to an embodiment of the present invention.

FIG. 12 is a flowchart illustrating a method of depositing a variable thickness material according to an embodiment of the present invention. The method comprises providing a substrate at step 1205. In some embodiments, the substrate may comprise a growth surface including a diffractive structure. The diffractive structure may comprise a diffraction grating.

In some embodiments, the substrate may comprise a uniform diffractive structure including a plurality of diffractive elements and the variable thickness material may be characterized by a first diffractive element depth in the first region and a second diffractive element depth less than the first diffractive element depth in the second region. In some embodiments, the substrate may comprise a uniform diffractive structure including a plurality of diffractive elements and the variable thickness material may be characterized by a first diffractive element width in the first region and a second diffractive element width less than the first diffractive element width in the second region.

The method further comprises providing a shadow mask at step 1210. The shadow mask may have a first region with a first aperture dimension to aperture periodicity ratio and a second region with a second aperture dimension to aperture periodicity ratio less than the first aperture dimension to aperture periodicity ratio. In some embodiments, the shadow mask may be characterized by a varying aperture dimension to aperture periodicity ratio in two directions.

The method further comprises positioning the shadow mask adjacent the substrate at step 1215. The method further comprises performing a plasma deposition process on the substrate to deposit the variable thickness material at step 1220. A layer thickness adjacent the first region may be greater than a layer thickness adjacent the second region. In some embodiments, the variable thickness material may comprise a conformal layer.

In some embodiments, the shadow mask may comprise a plurality of apertures and a surface parallel to the plurality of apertures. The substrate may comprise a deposition surface. In some embodiments, positioning the shadow mask adjacent to substrate may comprise placing the surface of the shadow mask parallel to the deposition surface.

It should be appreciated that the specific steps illustrated in FIG. 12 provide a particular method of depositing a variable thickness material according to another embodiment of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 13:
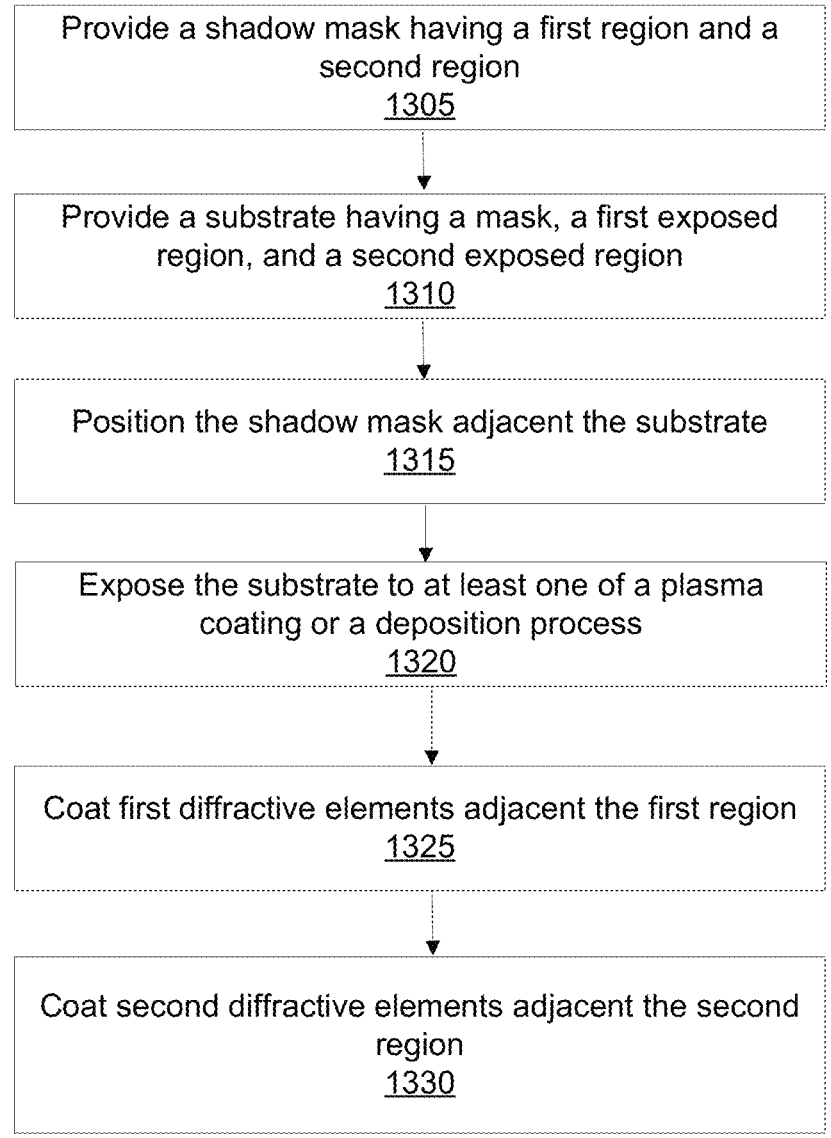
FIG. 13 is a flowchart illustrating a method of fabricating a master substrate according to an embodiment of the present invention.

FIG. 13 is a flowchart illustrating a method of fabricating a master substrate according to an embodiment of the present invention. The method comprises providing a shadow mask at step 1305. The shadow mask may have a first region characterized by a first gradient aperture dimension to aperture periodicity ratio in at least a first direction. The shadow mask may further have a second region characterized by a second gradient aperture dimension to aperture periodicity ratio in at least a second direction.

The method further comprises providing a substrate at step 1310. The substrate may have a mask characterized by diffractive features, a first exposed region, and a second exposed region. The method further comprises positioning the shadow mask adjacent the substrate at step 1315. The first region may be aligned with the first exposed region and the second region may be aligned with the second exposed region. The method further comprises exposing the substrate to at least one of the plasma coating or a deposition process at step 1320.

The method further comprises coating first diffractive elements adjacent the first region at step 1325. The first diffractive elements may be characterized by a first gradient depth and first line width profile in the at least a first direction. The method further comprises coating second diffractive elements adjacent the second region at step 1330. The second diffractive elements may be characterized by a second gradient depth and second line width profile in the at least a second direction. In some embodiments, the first gradient depth may be greater than the second gradient depth. In some embodiments, the first line width profile may be characterized by a first width and the second line width profile may be characterized by a second width less than the first width. Thus, the diffractive elements provided by some embodiments of the present invention may include variation in both depth and width as a function of position that are related to the shadow mask aperture dimension to aperture periodicity ratio.

It should be appreciated that the specific steps illustrated in FIG. 13 provide a particular method of fabricating a master substrate according to another embodiment of the present invention. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of depositing a variable thickness material, the method comprising:
   providing a substrate comprising a uniform diffractive structure including a plurality of diffractive elements;
   providing a shadow mask having a first region with a first aperture dimension to aperture periodicity ratio and a second region with a second aperture dimension to aperture periodicity ratio less than the first aperture dimension to aperture periodicity ratio;
   positioning the shadow mask adjacent the substrate; and performing a deposition process on the substrate to deposit the variable thickness material, wherein a layer thickness adjacent the first region is greater than a layer thickness adjacent the second region.

2. The method of claim 1 wherein the substrate comprises $SiO_2$.

3. The method of claim 2 wherein the uniform diffractive structure comprises a diffraction grating.

4. The method of claim 1 wherein the variable thickness material comprises a conformal layer.

5. The method of claim 1 wherein:
the shadow mask comprises a plurality of apertures and a surface parallel to the plurality of apertures;
the substrate comprises a deposition surface; and
positioning the shadow mask adjacent the substrate comprises placing the surface of the shadow mask parallel to the deposition surface.

6. The method of claim 1 wherein the shadow mask is characterized by a varying aperture dimension to aperture periodicity ratio in two directions.

7. The method of claim 1 wherein the variable thickness material is characterized by a first diffractive element depth in the first region and a second diffractive element depth less than the first diffractive element depth in the second region.

8. The method of claim 1 wherein the variable thickness material is characterized by a first diffractive element width in the first region and a second diffractive element width less than the first diffractive element width in the second region.

9. The method of claim 1 wherein performing the deposition process on the substrate comprises a plasma deposition process.

10. A method of fabricating a master substrate, the method comprising:
providing a shadow mask having:
a first region characterized by a first gradient aperture dimension to aperture periodicity ratio in at least a first direction; and
a second region characterized by a second gradient aperture dimension to aperture periodicity ratio in at least a second direction;
providing a substrate having:
a mask characterized by diffractive features;
a first exposed region; and
a second exposed region;
positioning the shadow mask adjacent the substrate, wherein the first region is aligned with the first exposed region and the second region is aligned with the second exposed region;
exposing the substrate to at least one of a plasma coating or a deposition process;
coating first diffractive elements adjacent the first region, wherein the first diffractive elements are characterized by a first gradient depth and first line width profile in the at least a first direction; and
coating second diffractive elements adjacent the second region, wherein the second diffractive elements are characterized by a second gradient depth and second line width profile in the at least a second direction.

11. The method of claim 10 wherein the first gradient depth is greater than the second gradient depth.

12. The method of claim 10 wherein the first line width profile is characterized by a first width and the second line width profile is characterized by a second width less than the first width.

13. The method of claim 10 wherein:
the first region is further characterized by a third gradient aperture dimension to aperture periodicity ratio in at least a direction orthogonal to the first direction;
the second region is further characterized by a fourth gradient aperture dimension to aperture periodicity ratio in at least a direction orthogonal to the second direction;
the first diffractive elements are further characterized by a third gradient depth profile in the direction orthogonal to the first direction; and
the second diffractive elements are further characterized by a fourth gradient depth profile in the direction orthogonal to the second direction.

14. The method of claim 10 wherein:
the first gradient aperture dimension to aperture periodicity ratio is equal to the second gradient aperture dimension to aperture periodicity ratio; and
the first direction and the second direction are a same direction.

15. The method of claim 10 wherein:
the first gradient aperture dimension to aperture periodicity ratio is defined by a constant center-to-center spacing of apertures and a graded aperture dimension along the first direction; and
the second gradient aperture dimension to aperture periodicity ratio is defined by a constant center-to-center spacing of apertures and a graded aperture dimension along the second direction.

16. The method of claim 10 wherein:
the first gradient aperture dimension to aperture periodicity ratio is defined by a constant aperture dimension along the first direction and a graded center-to-center spacing of apertures; and
the second gradient aperture dimension to aperture periodicity ratio is defined by a constant aperture dimension along the second direction and a graded center-to-center spacing of apertures.

17. The method of claim 10 wherein the substrate comprises a silicon substrate.

18. The method of claim 10 wherein the substrate comprises a diffractive structure including a diffraction grating.

19. The method of claim 18 wherein the deposition process comprises a plasma deposition process.

20. The method of claim 10 wherein the substrate comprises a conformal layer.

* * * * *